Jan. 19, 1943.　　　C. H. HART　　　2,308,753
VALVE
Filed Nov. 1, 1941
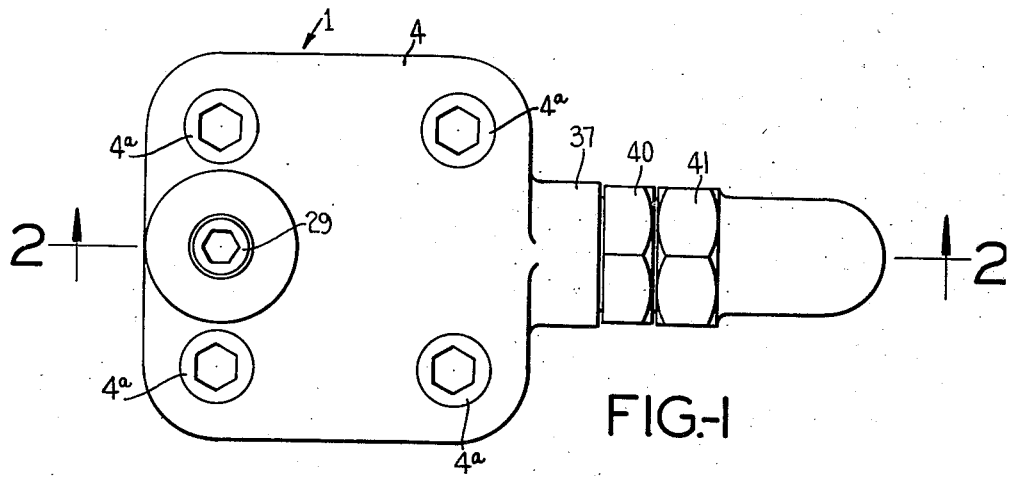
FIG.-1
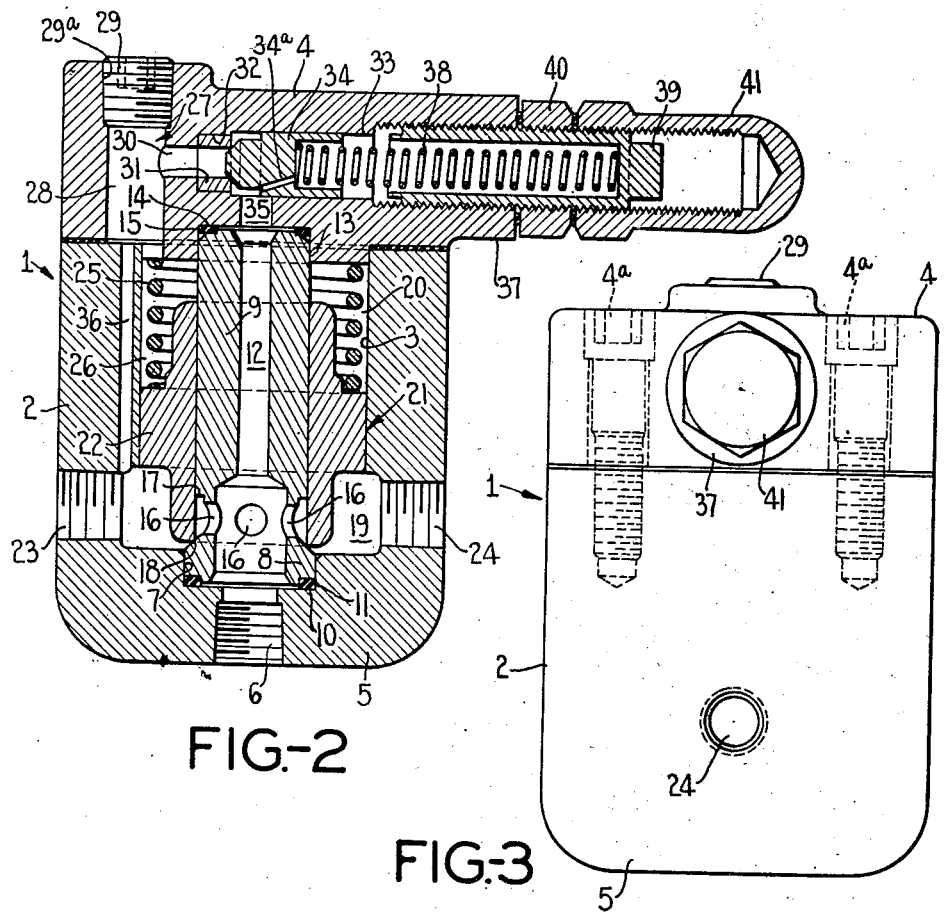
FIG.-2
FIG.-3
INVENTOR
Charles H. Hart
BY
Foulds & Foulds
his ATTORNEYS Patented Jan. 19, 1943

2,308,753

UNITED STATES PATENT OFFICE 2,308,753

VALVE

Charles H. Hart, Detroit, Mich.

Application November 1, 1941, Serial No. 417,454

9 Claims. (Cl. 137—53)

This invention relates to new and useful improvements in valves and more particularly to a valve operable when a greater than desired pressure is supplied to maintain a substantially constant pressure by relieving excess pressure and which is particularly adapted for controlling and regulating hydraulic pressures in conduits or other supply lines, such as are employed in the operation for example of hydraulic drills.

An object of this invention is to provide a novel pressure relief valve which will operate efficiently and which is of simple construction.

Another object is to provide a valve having a minimum differential between the pressures at which it will open and close so that with a supply pressure greater than the desired maximum, the pressure maintained at the valve outlet will be substantially constant.

Another object is to provide a regulating or relief valve in which leakage of controlling pressure is substantially eliminated.

Other and further objects and advantages will be apparent from a reading of the detailed description hereinafter set forth.

The invention consists in the improved construction and combination of parts, to be more fully described hereinafter and the novelty of which will be particularly pointed out and distinctly claimed.

In the accompanying drawing to be taken as a part of this specification there is fully and clearly illustrated a preferred embodiment of the invention, in which drawing, Figure 1 is a top plan view of a valve embodying the invention;

Fig. 2 is a view in vertical section on the line 2—2 of Fig. 1, and

Fig. 3 is an end view in elevation looking from the right of Fig. 2.

Referring to the drawing by characters of reference, the numeral 1 designates a casing or housing of steel, for example, having a hollow body or base member 2 preferably substantially rectangular in horizontal cross-section and having an internal cylindrical cavity or chamber 3 extending longitudinally from or normal to the cover or cap member 4. A plurality of countersunk machine screws 4ª, preferably socket head type and four in number, serve to tightly clamp and seal the cover and body members together. Extending through the bottom wall 5, there is a by-pass outlet port 6 internally screw-threaded for connection of or to a pipe for leading off excess fluid, as to a reservoir or the supply tank. The port 6 is concentric with chamber 3 and has at its inner end and opening in the chamber a cylindrical recess 7 of enlarged diameter. Fitting within the recess 7, there is the lower enlarged cylindrical end 8 of a cylindrical guide member or post 9 which has an annular peripheral end recess 10 to receive a ring of packing material 11 which seats against the recess wall to seal the lower end of the guide member to the wall 5. The guide member 9 has a longitudinal bore or passageway 12 therethrough which opens at its lower end through an enlarged diameter bore portion into the port 6 with which the bore is aligned. The upper end portion of the guide member fits within a cylindrical recess 13 in the underface of the cover member 4 and has an annular peripheral end recess 14 for receiving a ring of packing material 15 which seats against the recess wall to seal the upper end of the guide member 9 to the cover member 4. It may be noted that the sealing rings 11 and 14 permit of a slight manufacturing tolerance in the length of guide member 9 so as to assure the tight fitting of the cover and body members together. The recesses 7 and 13 are concentric with the chamber 3 so that the guide member 9 is accurately positioned therein and forms with the chamber wall a true annular chamber. Closely adjacent the bottom wall 5 and the guide member end 8, the guide member 9 has a plurality of lateral and radial ports 16, preferably four in number, for establishing communication between the chamber 3 and the by-pass port 6. The ports 16 preferably open into an external circumferential groove 17, the lower shoulder or wall of which and the upper annular end face of the end 8 being flared downward and outward in conical form to provide a circular valve seat 18 having its seating or receiving portion conforming to the extended circumference of the member 9, that is, being of equal diameter to the diameter of the member 9.

Within the chamber 3 and dividing the cavity into a lower compartment or flow chamber 19 and an upper compartment or pressure chamber 20, there is a reciprocable, pressure responsive valve member 21, preferably in the form of a hollow cylinder which has a free-sliding, preferably lapped fit, on the guide member 9. Intermediate its ends, the valve member 21 has a lateral surrounding or annular flange 22 which slidably fits the internal cylindrical wall of chamber 3, the fit preferably being a lapped joint. At its lower end, the valve member 21 has a sharp-cornered inner periphery to provide substantially a line engagement with the seat 18 so that no increase in surface pressure area of the lower end face of the valve member will occur when it moves off its seat. Opening into the annular chamber 19 there is an internally screw-threaded inlet port 23 and diametrically opposed there is an internally screw-threaded outlet port 24, the inlet port being adapted for connection to a source of liquid or fluid under pressure and the outlet port being adapted to be connected to the point of delivery of the pressure fluid. Positioned in the pressure chamber and surrounding the guide member 9, there is a helical coil spring 25 which is held under compression between the cover member 4 and the top face of the flange 22, the annular recess between the upper portion of the valve member and the cavity wall serving to position the spring.

In the cover member 4, above and preferably directly over the inlet 23, there is a passageway 27 having a vertical bore 28 closed by a threaded plug 29 which may be removed to bleed or release air from the interior of the casing, as for example in the event the pressure creating pump should lose its prime, or for the use of a pressure gauge. If desired, the plug 29 may be removed for connection of its port 29ª to a conduit containing a control valve and leading back to the supply tank, for a purpose to be described. The passageway 27 has a horizontal portion 30 in which there is an annular valve seat member 31 tightly fitted in a recess 32. Extending coaxially from portion 30, there is a guide bore 33 in which is reciprocally supported a pressure responsive piston type relief valve 34 having a conical or tapered end portion engageable with the seat member 31 to close tightly the passageway 27. The guide portion of valve 34 may be of polygonal stock or may have a bleed port 34ª so that liquid will not be trapped behind the valve stem and thereby interfere with the opening or proper operation of the valve 34. On the outlet side of the valve 34, there is a vertical passageway portion 35 alined with the guide member bore 12 and opening thereinto. The chamber 19 and inlet port 23 are, by means of a restricted conduit 36, in communication with the passageway 27 which has its portion 28 opening into the chamber 28 so that the chambers 19 and 28 are normally maintained at substantially the same or equal pressure, but flow to passageway portion 28 lags, or fails to satisfy the evacuation caused by the opening of valve 34, thereby creating a differential of pressures in chambers 19 and 28 and causing a consequent unbalance of pressures on and which will open the valve member 21. The flow area of conduit 36 should be determined in accordance with the viscosity of the liquid employed, the more viscous liquids requiring a greater flow area. For example, the diameter of conduit 36 may be ³⁄₆₄" for oil having a viscosity of 315 S. S. U. at 100° F. when operation is to occur between say 65° F. and 155° F.

In the outer end of bore 33 which extends through a cover member extension 37, there is an adjustment spring 38 of elongated helical coil type to provide flexibility for accurate and fine adjustment. The spring 38 seats at one end in the hollow recessed end portion of the valve 34 and seats at its other end against the base of a long hollow adjustment screw 39 which projects from the extension 37 and is locked in place with suitable gaskets by a nut 40. A tubular cap or cover 41 houses the outer end of the screw 39 and is internally threaded so that it may be turned up upon the screw 39 into tight abutment with the gasketed nut 40.

The operation of the valve is as follows, assuming that the inlet port 23 has been connected to a suitable liquid pressure source, such as a pump fed from a supply tank, that the outlet port 24 has been connected to the point of delivery, as for example, a drill feeding piston, and that the by-pass port 6 has been connected to the supply tank for return thereto of excess or by-passed liquid. If adjustment is necessary, the cap member 41 is removed and the nut 40 is loosened, whereupon the adjustment screw 39 is turned in or out to increase or decrease, respectively, the maximum pressure in the outlet port or conduit 24 when the pump is of proper capacity to deliver the liquid in excess of the maximum pressure and then to maintain the outlet pressure at port 24 substantially constant. With the lock nut 40 and the cap member 41 replaced, if there is any air in the system, the plug 29 should be opened to release the air as above noted and then be tightly seated. The liquid, under pressure due to the resistance to flow beyond the outlet 24, as by the drill piston, will fill the chamber 19 and also flow through the conduit 36 to fill the chamber 28 and the conduit 27 on the inlet side of valve 34. The top and bottom or end surface areas of the piston-like valve member 21 are equal and therefore since the conduit 36 maintains the pressure in chamber 28 equal to that in chamber 19 as the pressure builds up in the supply line, including chamber 19, the valve member 21 will remain on its seat 18, the spring 25 serving primarily to overcome friction and inertia on valve closing movement and to assure that the valve is normally seated. As soon as the pressure at the inlet port 23 and in the chamber 19 exceeds by any amount the desired maximum pressure as determined by the setting of the valve 34, then the liquid pressure on the valve 34 will open it and cause an unbalance of the liquid pressure forces acting on the valve member 21 so that upon a pressure drop in chamber 28, which pressure drop is equal to the slight constant force required to move the valve member 21 upward, the valve member 21 will move to open position permitting the liquid in chamber 19 to by-pass through ports 16 and thence through passageway 12 and from the by-pass outlet port 6. The liquid released by the opening of valve 34, will flow through passageway portion 35 and thence via passageway 12 to and from the by-pass outlet port 6. The valve 34 functions with the valve member 21 so that the valve member 21 will throttle just enough liquid to the by-pass outlet port 6 to maintain the valve 34 in open position. As soon as the pressure in chamber 19 drops below the maximum pressure, the valve 34 will close and substantially instantaneously, the valve member 21 will be moved to its seat by its weight and by the spring 25. It will be noted that the valve member 21 does not present any added pressure surface to the liquid in chamber 19 when the valve member 21 moves from its seat, due to the line contact of the valve member with its seat and that the diameter of the seat contact line is equal to the inner circumference of the top and bottom ends of the annular valve member.

When a valved conduit leading from port 29ª is provided as above described, the opening of this conduit valve will relieve the pressure on the top face of the valve member 21, thereby causing the valve member 21 to open, so that the supply line to the port 23 will be "dumped" through the by-pass port 6 and there will be substantially no back pressure in the pump discharge line.

It will be apparent from the foregoing description that there is provided a valve of simple construction and efficient operation which will hold the discharge pressure at the desired maximum pressure provided the liquid pressure supply means is sufficient to exceed that maximum or which will limit the pressure to a desired maximum in the event a pressure surge of either long or short duration should tend to exceed the maximum.

What is claimed as new and is desired to be secured by Letters Patent of the United States is:

1. In a valve of the character described, a casing having an internal guide member, a valve member reciprocally fitting on said member and dividing said casing internally into a flow chamber and a pressure chamber, said casing having an inlet port and an outlet port for said flow chamber and having a by-pass port, said guide member extending through said flow chamber and having a passageway for flow from said flow chamber to said by-pass port, said valve member controlling the inlet of fluid to said guide member passageway, means operable to equalize normally the fluid pressures in said chambers, means operable to maintain said valve member normally in a position closing the inlet to said passageway, and a pressure responsive valve member operable to relieve the fluid pressure in said pressure chamber and determining the fluid pressure in said flow chamber at which said first-named valve member will be moved to open said passageway inlet.

2. In a valve of the character described, a casing having an internal guide member, a valve member reciprocally fitting on said member and dividing said casing internally into a flow chamber and a pressure chamber, said casing having an inlet port and an outlet port for said flow chamber and having a by-pass port, said guide member extending through said flow chamber and having a passageway for direct flow from said flow chamber to said by-pass port, means operable to equalize normally the fluid pressures in said chambers, said guide member having a valve seat cooperable with the inner periphery of said valve member to control the inlet of fluid to said guide member passageway, means operable to maintain said valve member normally in endwise engagement with said seat to close the inlet to said passageway, and a pressure responsive valve member operable to relieve the fluid pressure in said pressure chamber and determining the fluid pressure in said flow chamber at which said first-named valve member will be moved to open said passageway inlet.

3. In a valve of the character described, a casing having an internal guide member, a valve member reciprocally fitting on said member and dividing said casing internally into a flow chamber and a pressure chamber, said casing having an inlet port and an outlet port for said flow chamber and having a by-pass port, said guide member having a passageway for flow from said flow chamber to said by-pass port, means operable to equalize normally the fluid pressures in said chambers, said guide member having a valve seat cooperable with the inner periphery of said valve member to control the inlet of fluid to said guide member passageway, means operable to maintain said valve member normally in endwise engagement with said seat to close the inlet to said passageway, and a pressure responsive valve member operable to relieve the fluid pressure in said pressure chamber and determining the fluid pressure in said flow chamber at which said first-named valve member will be moved to open said passageway inlet, said first-named valve member having substantially equal pressure responsive surface areas exposed respectively to said flow chamber and said pressure chamber and having substantially line contact with said seat thereby to maintain the pressure responsive surface areas of said first-named valve member substantially constant irrespective of the position of said first-named valve member.

4. In a valve of the character described, a casing having an internal centrally positioned guide member, a valve member having an aperture therethrough and reciprocally fitting around said member and dividing said casing internally into a flow chamber and a pressure chamber, said valve member having a surrounding flange reciprocally fitting the inner wall of said casing, said casing having an inlet port and an outlet port for said flow chamber and having a by-pass port, said guide member having a passageway for flow from said flow chamber to said by-pass port, said valve member controlling the inlet of fluid to said passageway, a conduit establishing restricted communication between said chambers and normally maintaining substantially equal fluid pressures therein, a coil spring surrounding said guide member and seating on said valve member flange to maintain said valve member normally in a position closing the inlet to said passageway, and a pressure responsive valve member operable to relieve the fluid pressure in said pressure chamber and determining the fluid pressure in said flow chamber at which said first-named valve member will be moved to open said passageway inlet.

5. In a valve of the character described, a casing having an internal guide member extending between the end walls of said casing, a valve member reciprocally fitting on said member and dividing said casing internally into a flow chamber and a pressure chamber, said casing having intermediate the ends of said guide member an inlet port and an outlet port for said flow chamber, said casing having a by-pass port, said guide member having a longitudinal internal passageway communicating with said by-pass port for flow from said flow chamber to said by-pass port, said valve member controlling the inlet of fluid to said passageway, means operable to equalize normally the fluid pressures in said chambers, means operable to maintain said valve member normally in a position closing the inlet to said passageway, a by-pass passageway leading from said pressure chamber to said guide member passageway, a pressure responsive valve member in said by-pass passageway and operable to relieve the fluid pressure in said pressure chamber by permitting flow of the fluid to said guide member passageway, and means acting on said pressure responsive valve member and determining the fluid pressure in said flow chamber at which said first-named valve member will be moved to open said passageway inlet.

6. In a pressure regulating valve, a casing having a body member and a cover member, said body member having a cylindrical cavity closed at one end by said cover member, a guide member concentrically positioned in said cavity and sealed to said cover member and to the bottom wall of said cavity, an annular valve member reciprocally fitting on said guide member and having a surrounding flange reciprocally fitting the cylindrical wall of said cavity, said guide member having a valve seat adjacent said bottom wall, said valve member dividing said cavity into a flow chamber and a pressure chamber, said guide member having a passageway extending longitudinally therethrough and having a lateral port opening from said flow chamber to said longitudinal passageway adjacent said valve seat, said body member having an inlet port and an outlet port for said flow chamber and having a by-pass port leading from said guide member passageway, a coil spring in said pressure chamber and surrounding one end of said valve member and being held under compression between said cover member and said flange to urge said valve member to said seat, said cover member having a passageway therethrough opening at one end into said pressure chamber and at its other end into said guide member passageway, said body member having a conduit for restricted flow from said inlet port to said cover member passageway, a pressure responsive valve member in said cover member passageway and controlling flow from said pressure chamber and said conduit to said guide member passageway, and means determining the fluid pressure in said pressure chamber at which said annular valve member will be moved away from said seat.

7. In a pressure regulating valve, a casing having a body member and a cover member, said body member having a cylindrical cavity closed at one end by said cover member, said body member and said cover member having aligned recesses concentric with said cavity, a cylindrical guide member having its ends seated and sealed in said recesses, an annular valve member reciprocally fitting on said guide member and having a surrounding flange reciprocally fitting the cylindrical wall of said cavity, said guide member having an enlarged diameter portion adjacent the bottom wall of said body member and having a circumferential recess adjacent said enlarged portion, said guide member having a conical surface extending into said circumferential recess and outward to the outer periphery of said enlarged portion of said guide member to provide a valve seat for said valve member, said valve member dividing said cavity into a flow chamber and a pressure chamber, said guide member having a passageway extending longitudinally therethrough and having a lateral port opening from said circumferential recess into said longitudinal passageway, said body member having an inlet port and an outlet port for said flow chamber and having a by-pass port leading from the base of said body member recess, a coil spring in said pressure chamber and surrounding one end of said valve member and being held under compression between said cover member and said flange to urge said valve member to said seat, said cover member having a passageway therethrough opening at one end into said pressure chamber and at its other end through the base of said cover member recess, said body member having a conduit for restricted flow from said inlet port to said cover member passageway, said cover member having a guide bore aligned with a portion of said cover member passageway, a piston valve slidable in said bore and controlling flow through said cover member passageway, a coil spring in said bore and acting against said piston valve to determine the pressure in said pressure chamber at which said annular valve member will be moved to open said lateral port, and an adjustable abutment member in said bore and holding said spring under compression.

8. In a valve of the character described, a casing having an internal guide member, a valve member reciprocally fitting on said member and dividing said casing internally into a flow chamber and a pressure chamber, said casing having an inlet port and an outlet port for said flow chamber and having a by-pass port, said guide member extending through said flow chamber and having a passageway for flow from said flow chamber to said by-pass port, said valve member controlling the inlet of fluid to said guide member passageway, means to equalize normally the fluid pressures in said chambers, said casing having a by-pass passageway leading from said pressure chamber to said guide member passageway, and a pressure responsive valve member in said by-pass passageway and movable to open position by pressure in said pressure chamber thereby to control the operation of said first-named valve member.

9. In a valve of the character described, a casing having an internal guide member, a valve member reciprocally fitting on said member and dividing said casing internally into a flow chamber and a pressure chamber, said casing having intermediate the ends of said guide member an inlet port and an outlet port for said flow chamber and having a by-pass port, said guide member extending through said flow chamber and having a passageway for flow from said flow chamber to said by-pass port, said valve member controlling the inlet of fluid to said guide member passageway, the wall of said casing having a restricted passageway extending between said chambers to equalize normally the fluid pressures in said chambers, said casing having a by-pass passageway leading from said pressure chamber to said guide member passageway, and a pressure responsive valve member in said by-pass passageway and movable to open position by pressure in said pressure chamber thereby to control the operation of said valve member.

CHARLES H. HART.